United States Patent
Kuroyama et al.

(10) Patent No.: US 8,394,503 B2
(45) Date of Patent: Mar. 12, 2013

(54) RESIN-METAL BONDED ARTICLE AND METHOD FOR PRODUCING THE SAME

(75) Inventors: Masumi Kuroyama, Kariya (JP); Kazuo Kato, Kariya (JP); Tomonori Ishikawa, Kariya (JP); Yaeko Sasaki, Morioka (JP); Setsuko Sato, Morioka (JP); Masayuki Nakamura, Morioka (JP); Shuhei Miura, Morioka (JP)

(73) Assignee: Toadenka Corporation, Morioka-shi, Iwate (JP)

( * ) Notice: Subject to any disclaimer, the term of this patent is extended or adjusted under 35 U.S.C. 154(b) by 385 days.

(21) Appl. No.: 12/735,062

(22) PCT Filed: Dec. 15, 2008

(86) PCT No.: PCT/JP2008/072777
§ 371 (c)(1),
(2), (4) Date: Oct. 12, 2010

(87) PCT Pub. No.: WO2009/078382
PCT Pub. Date: Jun. 25, 2009

(65) Prior Publication Data
US 2011/0033711 A1 Feb. 10, 2011

(30) Foreign Application Priority Data
Dec. 14, 2007 (JP) .................. 2007-322665

(51) Int. Cl.
*B32B 15/04* (2006.01)
*B32B 15/09* (2006.01)
*B32B 15/20* (2006.01)
*B32B 18/00* (2006.01)
*B32B 37/12* (2006.01)

(52) U.S. Cl. ........ 428/458; 428/457; 428/469; 428/472; 428/472.1; 427/96; 427/126.1; 427/126.3; 427/299; 427/307; 427/327; 427/337; 256/244.11; 256/244.23; 256/245; 256/297; 256/308.2; 256/308.6; 256/308.8

(58) Field of Classification Search .................. None
See application file for complete search history.

(56) References Cited

U.S. PATENT DOCUMENTS

| | | | | |
|---|---|---|---|---|
| 3,918,890 A | * | 11/1975 | Blaine | 432/54 |
| 3,993,848 A | * | 11/1976 | Feldstein | 428/457 |
| 4,259,113 A | * | 3/1981 | Nuzzi et al. | 106/1.11 |
| 4,450,190 A | * | 5/1984 | Nuzzi et al. | 427/304 |
| 5,569,545 A | * | 10/1996 | Yokono et al. | 428/626 |
| 6,998,455 B1 | * | 2/2006 | Ohta et al. | 526/310 |
| 7,037,597 B2 | * | 5/2006 | Takami | 428/647 |

(Continued)

FOREIGN PATENT DOCUMENTS

| | | | |
|---|---|---|---|
| JP | 62-259309 A | | 11/1987 |
| JP | 01-053492 | * | 3/1989 |

(Continued)

*Primary Examiner* — Vivian Chen
(74) *Attorney, Agent, or Firm* — Chapman and Cutler LLP (57) ABSTRACT

Disclosed is a resin-metal bonded article which is improved in adhesion between a copper component and a PPS or PBT resin. Also disclosed is a method for producing such a resin-metal bonded article. The resin-metal bonded article is obtained by bonding the resin component onto the surface of the copper component through a copper component bonding surface where there is copper oxide in the following range: $10\% \leq Cu_2O/(Cu_2O+CuO) \leq 75\%$. Preferably, this resin-metal bonded article further contains a triazine thiol derivative in the resin-component-side bonding surface of the copper component.

5 Claims, 1 Drawing Sheet

U.S. PATENT DOCUMENTS

| | | | | |
|---|---|---|---|---|
| 7,070,864 B2 * | 7/2006 | Ohta et al. | ................. | 428/473.5 |
| 7,232,478 B2 * | 6/2007 | Owei et al. | ................. | 106/14.41 |
| 7,682,432 B2 * | 3/2010 | Owei et al. | ................. | 106/14.41 |

FOREIGN PATENT DOCUMENTS

| | | | |
|---|---|---|---|
| JP | 01-053495 | * | 3/1989 |
| JP | 4-334093 A | | 11/1992 |
| JP | 5-051671 B2 | | 8/1993 |
| JP | 11-111908 A | | 4/1999 |
| JP | 11-243171 | * | 9/1999 |
| JP | 11-302822 | * | 11/1999 |
| JP | 2000-271957 A | | 10/2000 |
| JP | 2001-200374 A | | 7/2001 |
| JP | 2001-225352 A | | 8/2001 |
| JP | 2005-170054 A | | 6/2005 |
| JP | 2005-288856 | * | 10/2005 |
| JP | 2005-295604 A | | 10/2005 |
| JP | 2006-179229 A | | 7/2006 |
| JP | 2007-050630 A | | 3/2007 |

* cited by examiner

RESIN-METAL BONDED ARTICLE AND METHOD FOR PRODUCING THE SAME

TECHNICAL FIELD

The present invention relates to a resin-metal bonded article obtained by bonding a copper component to a polyphenylene sulfide (hereinafter abbreviated as PPS) or polybutylene terephthalate (hereinafter abbreviated as PBT) resin component and a method for producing the same, and in particular, to a resin-metal bonded article of a copper component and a PPS or PBT resin component which are bonded through a copper bonding surface which contains copper (I) oxide and copper (II) oxide at a certain ratio and a method for producing the same.

In recent years, reduction in weight has been demanded in various fields, such as home electronic products, cellular phones, automobile parts, personal computers and electronic parts.

As for the members where such reduction in weight has been demanded, metal members that have been used have been replaced with resin members.

However, it is difficult to replace metal members with resin members for the parts where properties unique to metals, such as high conductivity and thermal conductivity, are required. Accordingly, bonded bodies of a metal member and a resin member in which the metal member is used for the part where the above described properties are required and the resin member is used for the part where the above described properties are not required in order to reduce the weight have been researched.

Conventional methods that have been used for producing a bonded body of a copper component and a resin component include a method for bonding a copper component to a resin component using an adhesive and a method for bonding a copper component to a resin through insert molding or outsert molding according to which a melted resin is directly injected into a die where a copper component is placed. The resin-metal bonded articles produced in accordance with these conventional methods have defects such that adhesion between the copper component and the resin component is reduced greatly when left in a high temperature, high moisture environment or when heat is applied.

Meanwhile, Japanese Examined Patent Publication H5 (1993)-51671 (Patent Document 1) discloses an electrochemical surface processing method for the surface of a metal according to which a coating film of triazine thiol is formed on the surface of a metal member through electrodeposition and the thus formed composite relating to a technology for obtaining a resin-metal bonded article in which a resin member and a metal member adhere to each other.

In addition, Japanese Unexamined Patent Publication 2001-200374 (Patent Document 2) discloses a method for maintaining the reactivity of a metal's surface according to which a reactive compound that can be negatively charged reacts with or is absorbed by triazine trithiol metal salt formed on a metal surface as a coating film so that the reactivity of the triazine trithiol metal salt formed on the metal surface as a coating film is maintained.

However, such resin-metal bonded articles do not have enough strength in the bonding interface to bond a copper component to a resin component, and such a problem arises that adhesiveness lowers, which causes peeling, and the sealing properties cannot be maintained depending on the environment where they are used.

Patent Document 1: Japanese Examined Patent Publication H5 (1993)-51671
Patent Document 2: Japanese Unexamined Patent Publication 2001-200374

DISCLOSURE OF THE INVENTION

Problem to be Solved by the Invention

The present invention is provided in view of the above described problems with the prior art, and an object of the invention is to provide a resin-metal bonded article of a copper component and a PPS or PBT resin which is improved in adhesion and a method for producing the same.

Means for Solving Problem

In order to achieve the above described object, the present invention is provided on the basis of a discovery where a resin-metal bonded article with excellent adhesion can be obtained when there are copper (I) oxide and copper (II) oxide at a certain ratio on the copper bonding surface side between the copper component and the thermoplastic resin component, or when there is a triazine thiol derivative in addition to copper (I) oxide and copper (II) oxide at a certain ratio as described above on the copper bonding surface side.

In addition, the present invention is provided on the basis of a discovery where a composite, which is a resin-metal bonded article of a copper component and PPS or PBT with excellent adhesion, can be produced when a copper component makes contact with an oxidant solution and there are copper (I) and (II) oxides at a certain ratio, or when a triazine dithiol derivative is provided on the copper surface of a copper component in accordance with a wet method using a solution containing a triazine dithiol derivative, and then the copper component is made to make contact with an oxidant solution as described above so that copper (I) oxide and copper (II) oxide are provided at a certain ratio, and thus, the PPS or PBT is bonded to the copper component on the above described bonding surface side.

The first resin-metal bonded article according to the present invention is a resin-metal bonded article obtained by bonding a copper component to a polyphenylene sulfide or polybutylene terephthalate resin component and is characterized in that the copper component and the above described resin component are bonded through a copper component bonding surface where there is copper oxide in the following range on the surface of the above described copper component:

$$10\% \leq Cu_2O/(Cu_2O+CuO) \leq 75\%$$

The second resin-metal bonded article according to the present invention is the above described first resin-metal bonded article and is characterized in that there is a triazine thiol derivative on the bonding surface of the copper component on the resin component side.

The first method for producing a resin-metal bonded article according to the present invention is a method for producing a resin-metal bonded article characterized in that a copper component and a polyphenylene sulfide or polybutylene terephthalate resin component are bonded by including the steps of:

making a copper component and an oxidant solution make contact with each other so that the copper oxide on the bonding surface of the copper component on the resin component side has the following range:

$$10\% \leq Cu_2O/(Cu_2O+CuO) \leq 75\%, \text{ and}$$

insert molding a polyphenylene sulfide or polybutylene terephthalate resin with the copper component having copper oxide in the above described certain ratio.

The second method for producing a resin-metal bonded article according to the present invention is the above described first method for producing a resin-metal bonded article further including the step of carrying out a triazine process on a surface of the copper component before making the copper component make contact with the oxidant solution.

Preferably, the above described second method for producing a resin-metal bonded article according to the present invention is characterized in that during the above described triazine process, a coating film of triazine thiol is formed on a surface of the copper component in accordance with a wet method using a solution containing a triazine thiol derivative.

Here, copper components include copper components made of copper alloys, such as phosphor bronze, brass, oxygen-free copper, copper containing tin, copper containing iron and beryllium copper, in addition to copper components made of pure copper.

Effects of the Invention

The first resin-metal bonded article according to the present invention can have a firm bonding between the copper component and the thermoplastic resin component, and the excellent adhesion prevents peeling or breaking in the environment where it is used, for example, when used as a part for an automobile or the like.

In addition to the above described effects, the second resin-metal bonded article according to the present invention can have a firmer bonding between the copper component and the thermoplastic resin component when there is a triazine thiol derivative on the bonding surface of the copper component.

In addition, the method for producing a resin-metal bonded article according to the present invention can make it possible to efficiently produce the above described resin-metal bonded article according to the present invention.

When there are copper (I) and (II) oxides at the above described certain ratio on the above described copper bonding surface, adhesion between the copper component and the thermoplastic resin component becomes excellent. In addition, when there is a triazine derivative on the above described copper bonding surface, it becomes possible to further increase the adhesion.

That is to say, it is possible for the adhesion between the copper component and the thermoplastic resin to be further increased as a result of reaction between copper, triazine and thermoplastic resin in addition to the increase in adhesion due to the anchor effects between copper oxide and PPS or PBT.

EXPLANATION OF SYMBOLS

| 1 | resin-metal bonded article |
|---|---|
| 2 | copper component |
| 3 | resin component |

BEST MODE FOR CARRYING OUT THE INVENTION

The present invention is described on the basis of the following best mode but is not limited to this.

The first resin-metal bonded article according to the present invention is a resin-metal bonded article obtained by bonding a copper component to a polyphenylene sulfide or polybutylene terephthalate resin component and is characterized in that the copper component and the above described resin component are bonded through a copper component bonding surface where there is copper oxide in the following range on the surface of the above described copper component:

$10\% \leq Cu_2O/(Cu_2O+CuO) \leq 75\%$

Thus, copper (I) and (II) oxides having a certain area ratio may intervene between the copper component and the PPS or PBT resin component so that acid-base bonds of S—$Cu_2O$ form between $Cu_2O$ in the copper bonding surface and the main skeleton in the PPS resin, acid-base bonds of C=O—$Cu_2O$ between $Cu_2O$ and the main skeleton of the PBT resin, and anchor bonds due to the roughness of the copper oxide bonding surface and the PPS resin or PBT resin surface, providing excellent adhesion in the bonding interface between the copper component and the PPS or PBT component where a sufficient adhesiveness cannot be gained according to the prior art.

In addition, the second resin-metal bonded article according to the present invention is the above described first resin-metal bonded article where there is a triazine thiol derivative on the bonding surface of the copper component on the resin component side.

Thus, a triazine thiol derivative may intervene between the copper component and the PPS or PBT resin component, in addition to the copper oxide having a certain area ratio as described above, so that Cu—S chemical bonds form to provide an excellent bonding state between Cu in the copper component and the triazine thiol derivative, and in addition, acid-base bonds of S—$Cu_2O$ form between $Cu_2O$ in the bonding surface and the main skeleton in the PPS resin, C—N covalent bonds between the triazine thiol derivative and the terminal sensitive groups of the PPS resin, acid-base bonds of C=O—$Cu_2O$ between $Cu_2O$ and the main skeleton of the PBT resin, and anchor bonds due to the roughness between the triazine thiol derivative and the PPS resin or PBT resin surface, providing excellent adhesion in the bonding interface between the copper component and the PPS or PBT component.

Copper components that can be used for the resin-metal bonded article according to the present invention include copper components made of copper alloys, such as phosphor bronze, brass, oxygen-free copper, copper containing tin, copper containing iron and beryllium copper, in addition to copper components made of pure copper, and in addition, it is preferable for the resin bonded to the copper component to be a polyphenylene sulfide or polybutylene terephthalate resin.

The resin-metal bonded article according to the present invention is provided so that a copper component and a PPS or PBT resin component are bonded through a copper component bonding surface where there is copper oxide in the following range on the surface of the copper component that is bonded to the above described PPS or PBT resin component:

$10\% \leq Cu_2O/(Cu_2O+CuO) \leq 75\%$, preferably
$10\% \leq Cu_2O/(Cu_2O+CuO) \leq 50\%$ Concretely, the area ratio of $Cu_2O$ in the surface of the copper component that is bonded to the PPS or PBT resin component is $10\% \leq Cu_2O/(Cu_2O+CuO) \leq 75\%$ as found from the peak intensity.

This is because $Cu_2O$ is reaction points in the above described copper bonding surface, which contribute to the adhesion to the above described PPS or PBT resin, and can increase the number of S—$Cu_2O$ bonds between the above described copper bonding surface and the above described PPS or PBT resin so as to increase the adhesion.

In the case where the area ratio of $Cu_2O/(Cu_2O+CuO)$ is less than 10%, the number of S—$Cu_2O$ bonds is small, making the adhesiveness poor, while in the case where the area ratio of $Cu_2O/(Cu_2O+CuO)$ exceeds 75%, the adhesion is not preferable, probably because the ratio of $Cu_2O$ generated through the reaction with peroxides is small and sufficient roughness cannot be created.

The above described area ratio as found from the peak intensity is a value found by measuring the surface of the copper component bonded to the PPS or PBT resin component through XPS (X-ray photoelectron spectroscopy).

Concretely, the narrow scan spectrum of Cu2p on the surface of the copper component is analyzed through XPS (5600ci, made by ULVAC-PHI, Incorporated).

(Conditions for Measurement)
 Excited X-rays: mono-Al
 Incident angle of X-rays: 70°
 Measured area: ϕ 800 μm
 Conditions for correction: C—C or C—H in Cls corrected to 285.0 eV (Analysis)
 The Cu2p3/2 peak was divided into Cu(I) and Cu(II).
 The $Cu_2O$ ratio was calculated from Cu(I)/{Cu(I)+Cu(II)} using the peak area.

In the second resin-metal bonded article according to the present invention, a triazine thiol derivative intervenes on the bonding surface of the copper component, in addition to the copper (I) oxide and the copper (II) oxide having the above described certain area ratio.

[Chemical Formula 1]

(1)

Here, in the above general formula (1), R is —SM, —$OR^1$, —$SR^1$, —$NHR^1$, or —$N(R^1)_2$, $R^1$ is an alkyl group, an alkenyl group, a phenyl group, a phenyl alkyl group, an alkyl phenyl group or a cycloalkyl group, M is H, Na, Li, K, ½Ba, ½Ca, aliphatic primary, secondary or tertiary amines, or a quaternary ammonium salt. Here, the two M's in the above general formula may be the same or different.

In addition, concrete examples of triazine thiol derivatives that can be represented by the above general formula (1) are triazine thiol derivative salts, such as 1,3,5-triazine-2,4,6-trithiol (TT), 1,3,5-triazine-2,4,6-trithiol monosodium (TTN), 1,3,5-triazine-2,4,6-trithiol triethanol amine (F·TEA), 6-anilino-1,3,5-triazine-2,4-dithiol (AF), 6-anilino-1,3,5-triazine-2,4-dithiol monosodium (AFN), 6-dibutylamino-1,3,5-triazine-2,4-dithiol (DB), 6-dibutylamino-1,3,5-triazine-2,4-dithiol monosodium (DBN), 6-diarylamino-1,3,5-triazine-2,4-dithiol (DA), 6-diarylamino-1,3,5-triazine-2,4-dithiol monosodium (DAN), 1,3,5-triazine-2,4,6-trithiol di(tetrabutyl ammonium salt) (F2A), 6-dibutylamino-1,3,5-triazine-2,4-dithiol tetrabutyl ammonium salt (DBA), 6-dithiooctylamino-1,3,5-triazine-2,4-dithiol (DO), 6-dithiooctylamino-1,3,5-triazine-2,4-dithiol monosodium (DON), 6-dilaurylamino-1,3,5-triazine-2,4-dithiol (DL), 6-dilaurylamino-1,3,5-triazine-2,4-dithiol monosodium (DLN), 6-stearylamino-1,3,5-triazine-2,4-dithiol (ST), 6-stearylamino-1,3,5-triazine-2,4-dithiol monopotassium (STK), 6-oleylamino-1,3,5-triazine-2,4-dithiol (DL) and 6-oleylamino-1,3,5-triazine-2,4-dithiol monopotassium (OLK).

When there is a triazine thiol derivative on the surface of the copper component, firmer adhesion and longer durability can be gained than in the first resin-metal bonded article according to the present invention, where a copper metal component and PPS or PBT are bonded only when there is a certain copper oxide, as described above.

When there is a triazine thiol derivative, covalent bonds form between the triazine thiol derivative and the terminal sensitive groups in the PPS or PBT resin, and furthermore, anchor bonds form, due to the roughness on the surface of the triazine thiol derivative and the PPS or PBT resin, so that excellent adhesion and long durability can be gained.

In addition, the triazine thiol derivative on the surface of the copper component includes triazine thiol copper salts of a triazine thiol derivative and $Cu_2O$ or CuO, and polymers of a triazine thiol derivative, as well as $SO_4$, which is the deteriorated structure of a triazine thiol derivative.

In addition, it is desirable for the surface of the resin-metal bonded article according to the present invention on the PPS or PBT resin side to be rough, and it is more desirable for the roughness to be 5 nm to 100 nm.

This is because bonds form as a result, due to the anchor structure between the above described copper bonding surface and the above described PPS or PBT resin, so that the adhesion between the above described copper bonding surface and the above described PPS or PBT resin can be enhanced.

In particular, when the roughness is in the above described range, bonding can be achieved with an adequate anchor structure, and sufficient sealing performance can be provided without causing cracks in the bonding surface.

Next, the best mode of the method for producing a resin-metal bonded article according to the present invention is described.

The method for producing a first resin-metal bonded article according to the present invention is a method for producing a resin-metal bonded article, wherein a copper component and a polyphenylene sulfide or polybutylene terephthalate resin component are bonded by comprising the steps of making a copper component and an oxidant solution make contact with each other so that the copper oxide on the bonding surface of the copper component on the resin component side has the following range: 10%≦$Cu_2O/(Cu_2O+CuO)$≦75%, and insert molding a polyphenylene sulfide or polybutylene terephthalate resin with the copper component having copper oxide in the above described certain ratio.

That is to say, in accordance with the method for producing a first resin-metal bonded article according to the present invention, when there is copper oxide ((I) and (II)) at a certain area ratio which is chemically bonded or anchor bonded with a PPS or PBT resin on a copper component and the copper component having the copper oxide at the ratio on it is used as an insert member for insert molding with melted PPS or PBT, acid-base bonds are created between the copper oxide on the copper component bonding surface and the main skeleton of the PPS or PBT resin at a high temperature and under high pressure, and at the same time, the copper component and the PPS or PBT are integrated through insert molding so that a resin-metal bonded article can be produced.

A preferred embodiment is described below.

First, a pre-process is carried out on a copper component if necessary. Concretely, foreign substances, such as organic materials, are removed in the case they are attached, and a process for cleaning the surface of the copper component through degreasing, activation, washing and the like on the surface, may be provided if necessary.

Examples of degreasing include a method for immersing the copper component in an organic solvent and a method for immersing the copper component in an alkaline solution, such as of sodium hydroxide, and a chemical, such as sulfuric acid, hydrochloric acid or a fluorine-based solution, is used for the activation so that the oxide coating film on the surface of the copper is removed.

No problem arises with the oxide on the copper component as long as it does not significantly lower the conductance on the surface, and the same holds for the activation process.

The copper component on which a pre-process has been carried out is made to make contact with an oxidant solution if necessary.

During the process for making contact with an oxidant solution, the area ratio of the copper (I) oxide and copper (II) oxide on the surface of the copper becomes $10\% \leqq Cu_2O/(Cu_2O+CuO) \leqq 75\%$, as measured in accordance with the above described method. Preferably, the area ratio is $10\% \leqq Cu_2O/(Cu_2O+CuO) \leqq 50\%$.

When there is oxide copper having such an area ratio, as described above, acid-based bonds are created between the copper (I) oxide and the main skeleton of PPS or PBT so that the bonding becomes firmer.

In addition, as a result of the above described contact with the oxidant solution, roughness, preferably roughness of 5 nm to 100 nm, is created on the surface of the copper so that bonds with an anchor structure can be created between the copper bonding surface and the above described PPS or PBT resin, and thus, the bonds with the above described PPS or PBT resin can further be strengthened.

In addition, the oxidant used in the above described process for making contact with an oxidant solution is not particularly limited as long as it has properties as an oxidant, and hydrogen peroxide, potassium peroxide, sodium peroxide and hydroperoxide (methyl hydroperoxide, ethyl hydroperoxide, t-butyl peroxide) can be cited as examples, while an immersion method and a method for spraying a solution containing a peroxide can be cited as examples of a means for making contact.

Though the concentration of the oxidant in the above described oxidant solution is not particularly limited, it is desirable for the concentration of the peroxide solution to be 10 wt % to 50 wt % in an example of the manufacture of the first resin-metal bonded article according to the present invention because the provision of the copper oxide with the above described certain area ratio can be easily adjusted, and it is desirable for the concentration to be 0.5 wt % or more and 10 wt % or less, preferably 5 wt % or less, and more preferably 3 wt % or less in the case where the copper surface on which there is a triazine thiol derivative is made to make contact with a peroxide solution in an example of the manufacture of the second resin-metal bonded article according to the present invention because the copper (I) oxide can be easily adjusted to have the above described certain area ratio when the concentration is in this range so that bonding between the above described copper bonding surface and the above described PPS or PBT resin can be made sufficiently strong.

During the above described process for making contact with an oxidant, the optimal values for the conditions vary depending on the type of copper or copper alloy forming the copper component, the type of oxidant, the temperature at immersion and the time for immersion.

Next, during a process for insert molding with a melted PPS or PBT at a high temperature and high pressure using the above described copper component having a bonding surface as an insert member, the PPS or PBT is bonded to the copper member so that a resin-metal bonded article can be manufactured.

During the insert molding, the copper component is subject to a high temperature, and therefore as described above, acid-base bonds are created between the copper bonding surface and the main skeleton of the PPS or PBT resin and bonds with an anchor structure are created between the copper bonding surface and the thermoplastic resin due to the roughness on the copper bonding surface so that bonds between the copper component and the PPS or PBT can be strengthened.

In addition, the conditions in terms of the pressure for molding and the rate of injection can be set to appropriate values depending on the type of molding machine used, the type of resin for molding and the form of the mold.

An example of the above described second method for producing a resin-metal bonded article is the above described first method for producing a resin-metal bonded article characterized in that a coating film of a triazine thiol derivative is formed on the surface of a copper component in accordance with a wet method using a solution containing a triazine thiol derivative before the process for making contact with an oxidant solution.

That is to say, as described above, a pre-process is carried out on the surface of the copper component if necessary, and a triazine thiol derivative is provided on the surface of the copper component before the process for making the copper component make contact with an oxidant solution.

During the above described process for forming a coating film of a triazine thiol derivative, a coating film of a triazine thiol derivative is formed on the surface of the copper component in accordance with a wet method using a solution containing a triazine thiol derivative.

Here, the wet method means either an immersion method or an electrolytic polymerization method.

In the wet method, a solution of a triazine thiol derivative that can be represented by the above described formula (1) is used, and the properties of —SH in the triazine thiol derivative are used so that a coating film having high adhesion with Cu can be formed.

The immersion method is a method for forming a coating film by immersing the above described copper component, that is to say, a copper and copper alloy component, in a water solution, an organic solution or a mixed solution of these containing a triazine thiol derivative for ten seconds to three hundred seconds, preferably ten seconds to ninety seconds, for example. In this case, the concentration of the solution of the triazine thiol derivative is 0.0005 wt % to 1.0 wt %, preferably 0.0005 wt % to 0.2 wt %, and the optimal value varies depending on the type of copper or copper alloy forming the copper component, the temperature for immersion and the time for immersion.

Methyl alcohol, ethyl alcohol, isopropyl alcohol, acetone, toluene, ethylene glycol monoethyl ether, dimethyl formaldehyde, tetrahydrofran, methyl ethyl ketone, benzene and ethyl acetate can be used as the organic medium.

In addition, the temperature for immersion is different depending on the concentration of the solution and the type of metal and particularly can be determined by the solvent used, and therefore cannot be specified, and it is generally possible for the temperature range to be 1° C. to 99° C. for water, and desirably, the range is from 30° C. to 80° C. Though the immersion processing method can allow a coating film to be uniformly formed on a metal product having a complex form, the degree of polymerization is low in the coating film as it is and the strength is low, and therefore, it is possible to change the coating film to a polymer coating film having a high level of polymerization through heating to 100° C. or higher, for example, during the next insert molding after immersion. This immersion processing method is particularly effective for processing the surface of the Cu product of the present invention.

The electrolytic polymerization method is a method for forming a coating film of a triazine thiol polymer on the surface of a copper component in accordance with an electrolytic method, such as a cyclic method, a constant current method, a constant potential method, a constant pulse potential method and a constant pulse current method, using the copper component, which is a metal to be processed, as an anode and a platinum or stainless steel plate as a cathode in a water solution, an organic solution or a mixed solution of these containing an electrolyte and a triazine thiol derivative.

The above described electrolyte is not particularly limited as long as it dissolves in a solvent and has conductivity and stability, and in general, NaOH, $Na_2CO_3$, $Na_2SO_4$, $K_2SO_3$, $Na_2SO_3$, $K_2SO_3$, $NaNO_2$, $KNO_2$, $NaNO_3$, $NaClO_4$, $CH_3COONa$, $Na_2B_2O_7$, $NaH_2PO_2$, $(NaPO_3)_6$, $Na_2MoO_4$, $Na_3SiO_3$ and $Na_2HPO_3$ are appropriate for use. It is preferable for the concentration of these to be in a range from 0.001 mol to 1 mol, and more preferably, in a range from 0.01 mol to 0.5 mol from the point of view of the rate of growth of the coating film.

It is desirable for the above described solvent to dissolve an electrolyte and a triazine thiol derivative at the same time, and the combination thereof is not particularly limited, and water, methanol, ethanol, diethylene glycol monobutyl ether, dimethylformamide, methylpyrrolidone, acrylonitrile, ethylene carbonate, isopropyl alcohol, acetone, toluene, ethylene glycol monoethyl ether, dimethyl formaldehyde, tetrahydrofuran, methyl ethyl ketone, benzene and ethyl acetate can be used, for example.

The concentration of the triazine thiol derivative is 0.0005 wt % to 1.0 wt %, and preferably, 0.005 wt % to 0.2 wt %. The temperature of the electrolyte relates to the freezing point and the boiling point of the solvent, and therefore cannot be uniquely specified, but it is 1° C. to 99° C., preferably 30° C. to 80° C., when it is a water solution.

Any material can be used for the counter electrode (cathode) as long as it does not respond to the electrolyte or have a significantly low conductivity, and an inactive conductor, such as stainless steel, platinum or carbon, is generally used.

In the cyclic method, for example, the potential is in such a range that the water or solvent is not decomposed, and this range cannot be uniquely limited because it is affected by the type of solvent and electrolyte, but in the constant potential method, the potential is in a range from −0.5 VvsCES to 2 VvsCES, and preferably, in a range from a natural potential to an oxidation potential. When the potential is lower than the natural potential, no polymerization occurs, while when the potential exceeds the oxidation potential, there is a risk that the water or solvent may electrolyze.

In the constant current method, it is appropriate for the current density to be 0.005 mA/cm² to 50 mA/cm², and it is preferable for it to be 0.05 mA/cm² to 5 mA/cm². In the case of less than 0.005 mA/cm², it takes too long for the coating film to grow. In addition, in the case of exceeding 50 mA/cm², cracks may be created in the coating film or the Cu metal may elude, which is not preferable. The potential for electrolysis and the current density for electrolysis in the pulse method are as described above, and the time range is 0.01 minutes to 10 minutes, preferably 0.1 minutes to 2 minutes, which can be appropriately determined. In some cases when the time is shorter than 0.01 minutes or longer than 10 minutes, the effects of the pulse method are not sufficiently gained.

In the case where a foreign substance, such as an organic substance, is attached, it must be removed for the pre-process of the copper component, while an oxide does not cause a problem as long as it does not significantly lower the conductivity on the surface, and the same holds for an activation process and the like.

Thus, a coating film of a triazine thiol derivative can be formed on the surface of the above described copper, and Cu—S bonds form between the copper component and the coating film of the triazine thiol derivative so that firm adhesion is achieved. The triazine thiol derivative on the surface of the copper component includes a polymer of the triazine thiol derivative and $SO_4$, which is a deteriorated structure of the triazine thiol derivative, in addition to a triazine thiol copper salt of the triazine thiol derivative and $Cu_2$ or CuO.

Next, in accordance with the second method according to the present invention, a film of a triazine thiol derivative that chemically reacts with both the copper component and the PPS or PBT resin is formed on the surface of the copper component, and after that, the copper component on which a coating film of the triazine thiol derivative is formed is subject to the above described process for making contact with an oxidant so that oxides (I) and (II) having the above described certain area ratio are provided on the bonding surface of the copper component.

As a result, Cu—S chemical bonds between Cu in the copper component and the triazine thiol derivative form in the interface through which the copper component and the PPS or PBT component are bonded so that an excellent bonding state is provided, and at the same time, S—$Cu_2O$ acid-base bonds between $Cu_2O$ in the bonding surface and the main skeleton of the PPS resin, C—N covalent bonds between the triazine thiol derivative and the terminal sensitive groups in the PPS resin, and C=O—$Cu_2O$ acid-base bonds between $Cu_2O$ and the main skeleton of the PBT resin and anchor bonds due to roughness on the surfaces of the triazine thiol derivative and the PPS resin or the PBT resin form so that excellent adhesion is provided.

Next, a PPS or PBT resin is bonded to the copper component during an insert molding process for insert molding a PPS or PBT resin melted at a high temperature and under high pressure using the above described copper component as an insert member, and thus, a resin-metal bonded article can be produced.

In addition, it is also possible to provide an annealing process at 100 t or higher and at the melting point of the PPS or PBT resin or lower for approximately 0.5 hours to 5 hours after the above described insert molding process if necessary.

When such an annealing process is carried out, the adhesion can further be increased along with productivity.

The thus gained resin-metal bonded article according to the present invention can have a tensile strength of 20 MPa or higher when measured with a precise load measurer (1840 N, made by Aikoh Engineering Co., Ltd.), which means that the remaining resin in the broken portion is 50% or higher of the area when broken:

EXAMPLES

The present invention is described using the following examples, comparative examples, and test examples.

Here, the examples and comparative examples were prepared using the following copper test pieces, chemicals and resins.
(Copper Test Plate)
Table 1 below shows the standards and dimensions of the copper test plate used.

TABLE 1

| test piece | JIS Standard | dimensions |
|---|---|---|
| pure copper | (C1100) | 12 × 40 mm, thickness: 3 mm |
| phosphor bronze | (C5191) | 12 × 49 mm, thickness: 1.5 mm |

(Resins)
The trade names of the used resins are as follows.
trade name of PPS (polyphenylene sulfide): Susteel BGX-130 (made by Tosoh Corporation)
trade name of PPS (polyphenylene sulfide): 601-044 (made by Tosoh Corporation)
trade name of PBT (polybutylene terephthalate): Duranex 7407 (made by Polyplastics Co., Ltd.)
(Chemicals)
Table 2 shows the trade names of the used chemicals together with the processes used.

TABLE 2

| process | chemical name | concentration | | manufacturer |
|---|---|---|---|---|
| washing (removal of grease) | SK-144 | | 50 g/L | Ebara-Udylite Co., Ltd. |
| washing (activation) | refined sulfuric acid | purity 98% | 100 mL/L | Kitanihon Kosan Co., Ltd. |
| surface process 1 (triazine thiol derivative coating film forming process) | 1,3,5-triazine-2,4-dithiol-6-sodium thiolate(TTN) 6-anilino-1,3,5-triazine-2,4-diol monosodium(AFN) 6-oleyl amino-1,3,5-triazine-2,4-dithiol monopotassium(OLK) | | | |
| surface process 2 (oxider solution making contact process) | hydrogen peroxide solution sodium peroxide t-butyl hydroperoxide | purity 35% purity 87% 70% aqueous solution | | Santoku Chemical Industries Co., Ltd. Kanto Chemical Co., Inc. MERCK KGaA |

Examples 1 to 17

Figure 1:
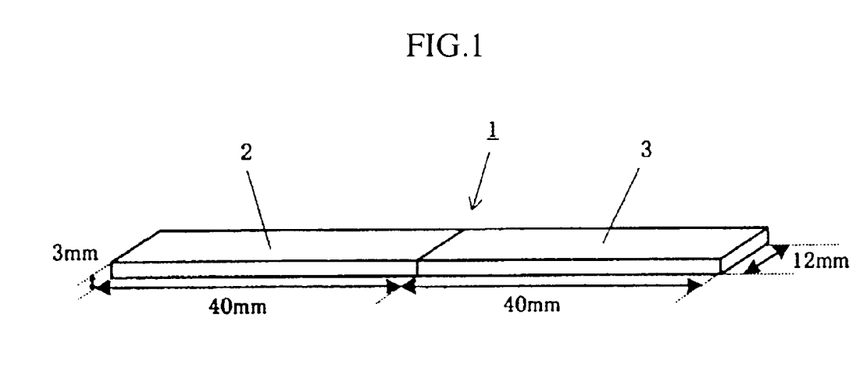
FIG. 1 is a schematic diagram showing an example of a resin-metal bonded article.

Resin-metal bonded articles 1, as shown in FIG. 1, were produced.
First, a pre-process using the chemicals shown in Table 2 was carried out on the surface of the pure copper test plates 2 and the phosphor bronze test plates 2 shown in the above Table 1.
Concretely, grease was removed from the surface of the pure copper test plates 2 and the phosphor bronze test plates 2 through immersion in the above described "SK-144" (concentration: 50 g/L) at 60° C. for five minutes, and then, a surface activation process was carried out through immersion in the above described chemical "refined sulfuric acid" (concentration: 100 ml/L) at 25° C. for one minute so that a pre-process was carried out.
Next, as shown in Table 3, the surface process 2 or the surface process 1 was carried out on the pure copper test plates 2 and the phosphor bronze test plates 2 after the above described pre-process, and after that, a surface process 2 was carried out.
Concretely, in the surface process 1, the test plates on which a pre-process was carried out were immersed in the TTN, OLK or AFN solution in Table 2 so that a coating film 4 of a triazine thiol derivative was formed on the surface of the test plates 2 (triazine thiol derivative coating film forming process: surface process 1).

Figure 2:
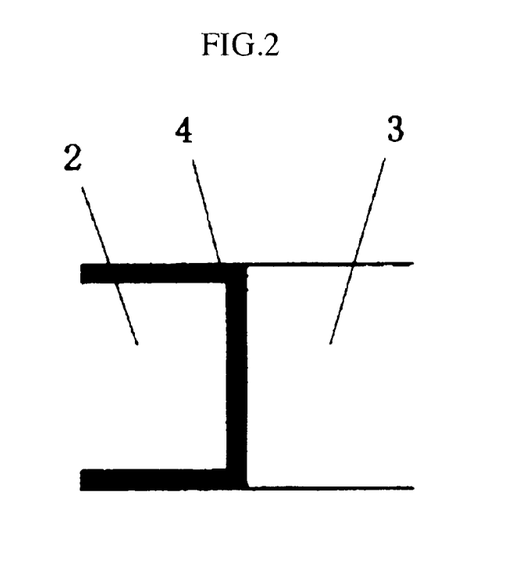
FIG. 2 is a schematic diagram showing an example of a bonding portion in a resin-metal bonded article.

In the surface process 2, the pure copper test plates on which a pre-process had been completed and pure copper test plates and phosphor bronze test plates on which the above described surface process 1 had been completed were immersed in hydrogen peroxide, sodium peroxide and Perbutyl (t-butyl hydroperoxide) aqueous solutions under the conditions for the surface process 2 shown in Table 3, and thus, a process for making the surface of the test plates make contact with a peroxide solution was carried out (surface process 2).
Next, the surface of the thus gained pure copper test plates and phosphor bronze test plates was washed with ion-exchanged water at 80° C. for one minute, and after that, the surface was dried.
Next, injection molding was carried out on the surface of the thus gained pure copper test plates and phosphor bronze test plates with the above described PPS resin or PBT resin 3 using an injection molder (product name: TH20E, made by Nissei Plastic Industrial Co., Ltd.) with the temperature of the die being at 140° C. (insert molding process) so that the PPS resin or PBT resin 3 was bonded onto the pure copper test plates and phosphor bronze test plates, and thus, the resin-metal bonded articles 1 were formed (FIGS. 1 and 2).

Comparative Example 1

Resin-metal bonded articles were formed in the same manner as in the above described Example 1, except that the above described coating film forming process and process for making contact with a peroxide solution were not carried out.

Comparative Example 2

Examples of resin-metal bonded articles where the value of $Cu_2O/(Cu_2O+CuO)$ in terms of the area ratio of copper oxide on the copper bonded surface exceeds 75%.

Comparative Example 3

Examples of resin-metal bonded articles where the value of $Cu_2O/(Cu_2O+CuO)$ in terms of the area ratio of copper oxide on the copper bonded surface is smaller than 10%.

Test Examples

The resin-metal bonded articles gained in the above described Examples 1 to 17 and Comparative Examples 1 to 3 were subject to the following tests.
(Strength of Adhesion)
The strength of adhesion is represented by the tensile strength of the gained resin-metal bonded articles.

Concretely, the two ends of the resin-metal bonded articles, that is to say, the copper component and the PPS or PBT resin, were held and pulled apart so that they were peeled from each other using a precise load measurer (product number: 1840N, made by Aikoh Engineering Co., Ltd.), and the tensile strength at this time was measured.

In the case where the tensile strength was 20 MPa or higher, there was sufficient adhesion.

The gained results are shown in Table 3.

<Peak Strength Area Ratio of $Cu_2O$>

The peak strength area ratio of $Cu_2O$ and CuO on the surface of the gained copper component after the surface process 2 was carried out was measured in accordance with XPS (X-ray Photoelectron Spectroscopy), and the results are shown in Table 3.

Concretely, a narrow scan spectrum of Cu2p was analyzed on the surface of the copper component that was not bonded to the PPS or PBT resin component in the resin-metal bonded articles using an XPS (5600ci, made by ULVAC-PHI, Incorporated).

(Measurement Conditions)
Excitation X-rays: mono-Al
Incident angle of X-ray: 70°
Measured area: φ800 μm
Correction conditions: C—C or C—H in C1s is corrected to 285.0 eV (Analysis)
Cu2p3/2 peak was divided to Cu(I) and Cu(II).
The $Cu_2O$ ratio was calculated from Cu(I)/{Cu(I)+Cu(II)} using the peak area.

The gained results are shown in Table 3.

TABLE 3

| Example | copper component | surface process 1 chemical | concentration (wt %) | temperature (° C.) | time (sec) | surface process 2 chemical | concentration (wt %) |
|---|---|---|---|---|---|---|---|
| Example 1 | pure copper | — | — | — | — | hydrogen peroxide | 49.2 |
| Example 2 | pure copper | — | — | — | — | hydrogen peroxide | 24.5 |
| Example 3 | pure copper | — | — | — | — | hydrogen peroxide | 12.3 |
| Example 4 | pure copper | OLK | 0.033 | 60 | 60 | hydrogen peroxide | 2.5 |
| Example 5 | pure copper | AFN | 0.0002 | 60 | 60 | hydrogen peroxide | 0.5 |
| Example 6 | pure copper | TTN | 0.002 | 40 | 60 | hydrogen peroxide | 2.5 |
| Example 7 | pure copper | TTN | 0.002 | 40 | 60 | hydrogen peroxide | 0.5 |
| Example 8 | pure copper | TTN | 0.002 | 40 | 60 | hydrogen peroxide | 0.5 |
| Example 9 | pure copper | TTN | 0.002 | 40 | 60 | hydrogen peroxide | 0.05 |
| Example 10 | pure copper | TTN | 0.002 | 40 | 60 | hydrogen peroxide | 0.5 |
| Example 11 | pure copper | TTN | 0.002 | 40 | 60 | hydrogen peroxide | 0.5 |
| Example 12 | pure copper | TTN | 0.002 | 40 | 60 | hydrogen peroxide | 2.5 |
| Example 13 | pure copper | TTN | 0.002 | 40 | 60 | sodium peroxide | 4 |
| Example 14 | pure copper | TTN | 0.002 | 40 | 60 | Perbutyl ※1 | 3 |
| Example 15 | phosphor bronze | TTN | 0.002 | 40 | 60 | hydrogen peroxide | 2.5 |
| Example 16 | phosphor bronze | TTN | 0.001 | 40 | 60 | hydrogen peroxide | 0.5 |
| Example 17 | phosphor bronze | TTN | 0.001 | 40 | 30 | hydrogen peroxide | 0.5 |
| Comparative Example 1 | pure copper | — | — | — | — | — | — |
| Comparative Example 2 | pure copper | — | — | — | — | hydrogen peroxide | 0.5 |
| Comparative Example 3 | pure copper | — | — | — | — | hydrogen peroxide | 49.2 |

| Example | surface process 2 solvent | temperature (° C.) | time (sec) | resin | tensile strength (MPa) | XPS $Cu_2O$ | XPS CuO |
|---|---|---|---|---|---|---|---|
| Example 1 | water | 20 | 60 | BGX-130 | 24.5 | 10.6 | 89.4 |
| Example 2 | water | 20 | 60 | BGX-130 | 30.6 | 40.7 | 59.3 |
| Example 3 | water | 20 | 60 | BGX-130 | 24.2 | 67.8 | 32.2 |
| Example 4 | water | 30 | 180 | BGX-130 | 20.5 | 10.3 | 89.7 |
| Example 5 | water | 30 | 60 | BGX-130 | 22.5 | 11 | 89 |
| Example 6 | water | 30 | 60 | 601-044 | 30.5 | 10.8 | 89.2 |
| Example 7 | water | 30 | 60 | BGX-130 | 34.4 | 13.7 | 86.3 |
| Example 8 | water | 30 | 60 | 601-044 | 28.3 | 13.7 | 86.3 |
| Example 9 | water | 30 | 60 | BGX-130 | 25.8 | 41.4 | 58.6 |
| Example 10 | water | 30 | 20 | BGX-130 | 30.6 | 71.6 | 28.4 |
| Example 11 | water | 30 | 60 | Duranex7407 | 25.3 | 13.7 | 86.3 |
| Example 12 | water | 30 | 60 | Duranex7407 | 20 | 10.8 | 89.2 |
| Example 13 | water | 30 | 60 | BGX-130 | 35.2 | 70.7 | 29.3 |
| Example 14 | water | 40 | 60 | BGX-130 | 33.3 | 56.2 | 43.8 |
| Example 15 | water | 30 | 60 | BGX-130 | 44.5 | 16.1 | 83.9 |
| Example 16 | water | 30 | 60 | BGX-130 | 38.9 | 11.7 | 88.3 |
| Example 17 | water | 30 | 60 | BGX-130 | 49.3 | 10.9 | 89.1 |
| Comparative Example 1 | — | — | — | BGX-130 | 2.2 | 95 | 5 |
| Comparative Example 2 | water | 30 | 60 | BGX-130 | 8.1 | 88.2 | 11.8 |
| Comparative Example 3 | water | 40 | 120 | BGX-130 | 10.6 | 8.2 | 91.8 |

※1 Perbutyl = t-butyl hydroperoxide

It is clear from Table 3 that the resin-metal bonded article according to the present invention includes copper (I) oxide on the bonding surface with a specific area ratio, and therefore has excellent tensile strength, that is to say, a value of 20 MPa or higher as shown by the peeling test results, and thus, allows firmer bonding to be achieved.

INDUSTRIAL APPLICABILITY

The resin-metal bonded article according to the present invention can be used for any application for a member where a resin and a metal are bonded, and in particular, is appropriate for use as an automobile part.

The invention claimed is:

1. A resin-metal bonded article comprising a copper component bonded to a polyphenylene sulfide or polybutylene terephthalate resin component, wherein
    said copper component and said resin component are bonded through a bonding surface of the copper component comprising an area ratio of copper oxide in the following range:

$10\% \leq Cu_2O/(Cu_2O+CuO) \leq 75\%$.

2. The resin-metal bonded article according to claim 1, further comprising a triazine thiol derivative on the bonding surface of the copper component facing the resin component.

3. A method for producing a resin-metal bonded article having a copper component bonded to a polyphenylene sulfide or polybutylene terephthalate resin component, comprising the steps of:
    making a copper component and an oxidant solution make contact with each other so that a bonding surface of the copper component comprises an area ratio of copper oxide in the following range:

$10\% \leq Cu_2O/(Cu_2O+CuO) \leq 75\%$, and insert molding a polyphenylene sulfide or polybutylene terephthalate resin with the copper component.

4. The method for producing a resin-metal bonded article according to claim 3, further comprising the step of carrying out a triazine process on the bonding surface of the copper component before making the copper component make contact with the oxidant solution.

5. The method for producing a resin-metal bonded article according to claim 4, wherein
    said triazine process comprises the step of forming a coating film of triazine thiol copper salt on the bonding surface of the copper component in a wet method using a solution containing a triazine thiol derivative.

* * * * *